Figure 1:
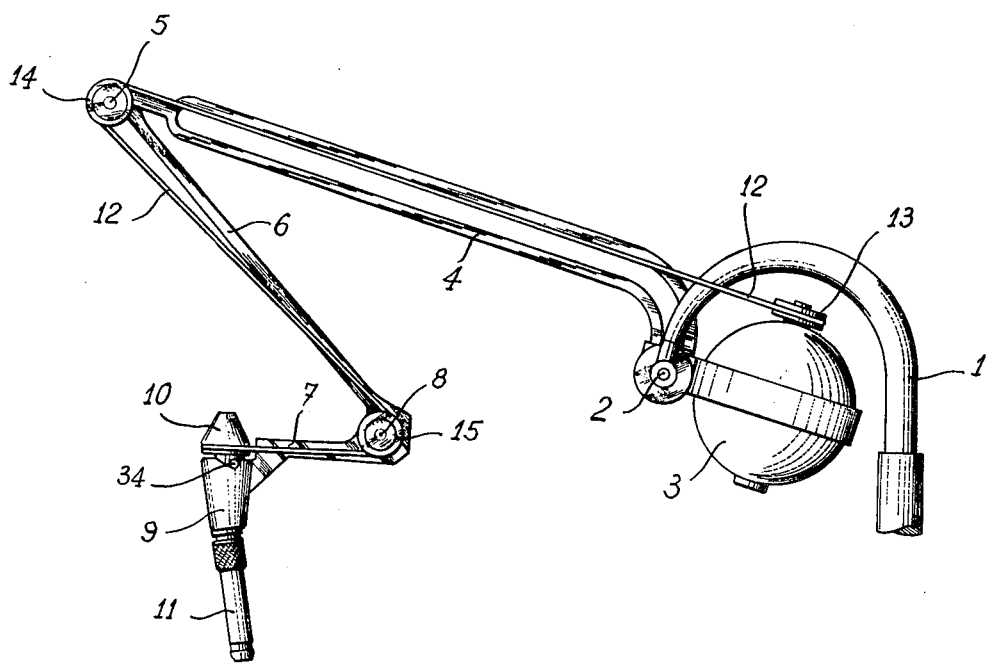

United States Patent Office 3,200,663
Patented Aug. 17, 1965

3,200,663
TWO-SPEED ARTICULATED ANCHORING
JOINT FOR DENTAL DRILL
Henri Leonard, Besancon, France, assignor to Micro-Mega, Besancon, Doubs, France, a French company
Filed Oct. 4, 1962, Ser. No. 228,338
Claims priority, application France, Apr. 27, 1962, 895,808
6 Claims. (Cl. 74—353)

The present invention relates generally to dental drills, and is particularly directed to a variable speed transmission for dental drills.

The handpiece of a dental drill is frequently attached to the drilling arm by an articulated coupling joint known as a "wrist joint."

The majority of these coupling joints are of one or the other of two types. In one type, the handpiece shaft is directly driven by the motor pulley. In the other type, the handpiece shaft is driven at high speed through an intermediate multiplying pulley or the like interposed between the pulley receiving the drive belt and the drive pulley for the handpiece shaft.

These coupling joints have the drawback of only allowing the handpiece to rotate at a single speed, that is, either at the normal speed for the first type or the high speed for the second type, without permitting a change from one to the other as required.

An important improvement has heretofore been made in the art by the provision of an articulated coupling joint having an intermediate shaft provided with a small pulley adapted to be engaged by a drive belt and a large pulley connected through an auxiliary belt with a small pulley on the handpiece shaft to provide increased speed of the handpiece shaft. The handpiece shaft also has a second pulley located so that the flexible drive belt may be transferred by hand from the pulley of the intermediate shaft to the second pulley on the handpiece shaft, thereby providing direct drive of the latter. Although this arrangement permits two different speeds to be obtained, the very existence of the intermediate shaft and the pulleys thereon results in a structure which is comparatively long and furthermore, the auxiliary belt gives rise to additional friction which absorbs energy.

Finally, the change from one speed to the other is effected by manually transferring the flexible drive belt from one pulley to the other and this may dirty the fingers of the operator.

It is an object of this invention to provide a change or variable speed transmission adapted to be incorporated in the wrist joint of the handpiece of a dental drill, and which avoids the above mentioned disadvantages of previously proposed arrangements.

In accordance with an aspect of this invention, the transmission comprises a body in which a sleeve is turnably mounted, a drive or input shaft adapted to be rotated by the usual drive belt of the dental engine engaging a pulley on the drive shaft, such drive shaft being rotatably mounted in the sleeve with the axis of rotation of the drive shaft being eccentrically located relative to the turning axis of the sleeve, two concentric gears of different pitch diameters secured on the drive shaft, and a driven shaft journalled in the body and carrying a gear which is selectively engaged by one or the other of the two gears on the drive shaft in response to turning of the sleeve, thereby to cause rotation of the driven shaft at corresponding different speeds.

In a preferred embodiment of the invention, the sleeve has a control arm extending radially therefrom to facilitate manual turning of the sleeve and consequent shifting of the transmission. Further, in accordance with another feature, the gears on the drive shaft and driven shaft are axially engageable and disengageable, and means are provided for axially displacing the sleeve in the direction disengaging the gears during turning of the sleeve for shifting the transmission.

Figure 2:
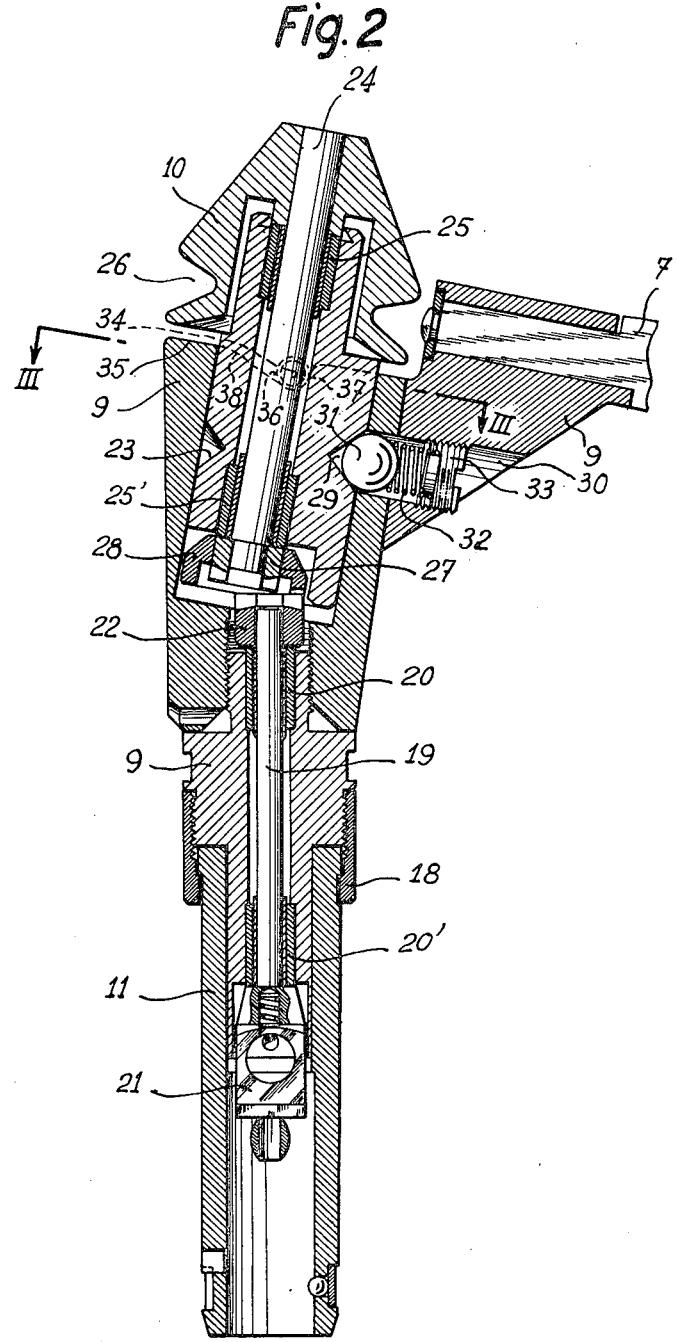
Figure 3:
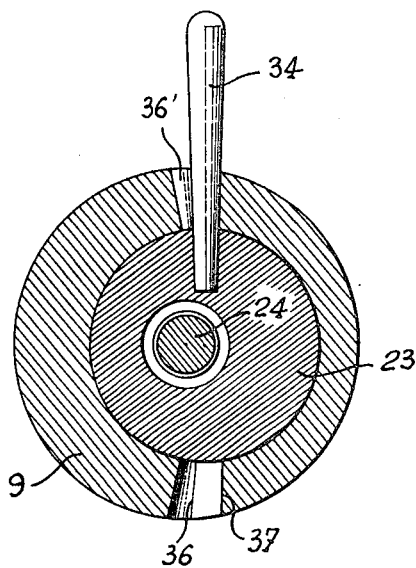
Figure 5:
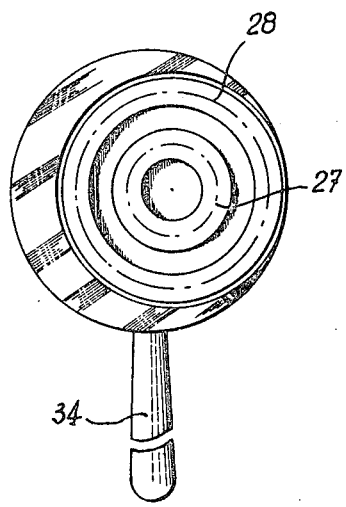
Figure 4:
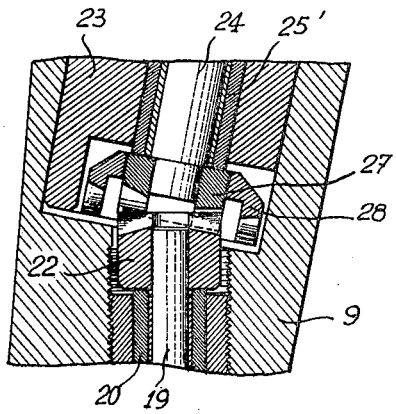
Figure 6:
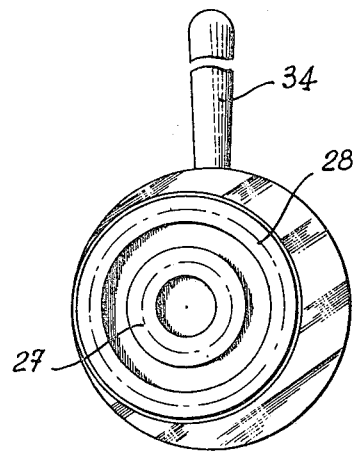

In order that the invention may be more clearly understood, reference will now be made to the accompanying drawings which show one embodiment thereof by way of non-limiting example, and in which:

FIGURE 1 is a side elevational view of a complete dental drill comprising an articulated coupling joint or wrist joint with a variable speed transmission according to the invention, FIGURE 2 is a longitudinal section of the wrist joint and showing the transmission according to the invention in the high speed position, FIGURE 3 is an enlarged sectional view taken along the line III—III of FIGURE 2, FIGURE 4 is a fragmentary longitudinal section of the gear transmission for the wrist joint in the normal or low speed position, and FIGURES 5 and 6 are diagrammatic views of the control lever positions and the positions of the drive pinions at normal speed and at high speed, respectively.

Referring now to the drawings in detail, it will be seen that the dental drill shown in FIGURE 1, comprises the usual foot or base support 1 from which the drill is suspended by means of a joint 2 having a horizontal pivot axis. The drill itself is constituted by a motor 3 acting as a counter-weight for an arm 4 which is pivotally connected at 5 to an arm 6. This arm 6 is pivotally connected at 8 with the wrist joint containing a gear transmission according to the invention. The wrist joint comprises a supporting arm 7 to which a body 9 is attached. The input for the transmission is constituted by a drive pulley 10, while the output of the transmission is constituted by a sleeve 11, within which the coupling to the handpiece is effected.

The input pulley 10 is driven through a transmission belt 12 which runs around a motor pulley 13 and passes over pairs of intermediate pulleys 14 and 15.

The sleeve 11 is secured to the lower portion of the body 9 by means of a threaded retaining ring 18.

In the lower part of the body 9, a driven shaft 19 is rotatably mounted in two bearings 20 and 20' for rotation about its longitudinal axis.

As its outer or lower end, the shaft 19 is provided with a screwdriver drive mechanism 21 which opens inside the sleeve 11 and into which fit the drive members for the handpiece. At its inner or upper end, the shaft 19 is provided with a bevel gear 22.

A sleeve 23 is turnable in the upper part of the body 9 with slight friction inside the latter, and the sleeve 23 is longitudinally traversed by a drive shaft 24 journalled in bearings 25 and 25'.

Externally of member 9, the upper end of shaft 24 is secured to the drive pulley 10 which is provided with a groove 26 for receiving the transmission belt 12.

The lower end of shaft 24 is secured to two concentric bevel gears of different diameters. The inner gear 27 has, for example, a number of teeth equal to that of gear 22 on shaft 19, and the outer gear 28 is provided with a greater number of teeth.

The axes of shafts 19 and 24 are in the same plane but they form a small angle between them (approximately 10°). Moreover, the axis of shaft 24 is eccentric in relation to the parallel axis of sleeve 23 so that rotation of sleeve 23 in the body 9 causes a displacement of the shaft 24 parallel to itself.

The teeth of gears 27 and 28 have the same pitch and modulus as the teeth of gear 22.

Gears 27 and 28 may thus be selectively engaged with gear 22 and, as a result of the angle formed by shafts 19 and 24, engagement and disengagement of the gears are facilitated.

In FIGURE 2, the large gear 28 is shown in engagement with gear 22, this corresponding to the position for high speed rotation of driven shaft 19.

The eccentricity of the shaft 24 in sleeve 23 is selected so that half a complete turn (180°) of sleeve 23 from the position of FIGURE 2 will cause a displacement of shaft 24 sufficient to engage the inner gear 27 with gear 22, while gear 28 is being disengaged.

This latter position, which is shown in detail in FIGURE 4, corresponds to the normal or low speed which, in this embodiment, causes rotation of output shaft 19 at the same speed as input shaft 24.

In order to retain the sleeve 23 in each of the positions stated above, two conical recesses 28 are formed, at diametrically opposed locations, in the surface of sleeve 23, and are selectively engageable by a detent or ball 31 urged inwardly in a bore 30 in body 9 by means of a spring 32 which abuts a threaded cap 33 adjustably screwed in the bore 30.

This arrangement precisely retains the sleeve 23 in one or the other of its correct positions and the pressure of the ball 31 is such that it is adequate to hold the sleeve in place during operation of the wrist joint so that no additional fixing of the sleeve is necessary.

The sleeve 23 also has a control handle or arm 34 projecting radially therefrom for use in turning the sleeve in the body 9. The control arm 34 rides on the upper edge 35 of member 9. This edge 35 forms a cam surface provided with notches 36 and 36′ located to receive the arm 34 in the stop positions of the sleeve and having a triple function.

In the first case, the maximum depth of the notch 36 or 36′ is such that when the handle or arm 34 is against the base of the notch, the penetration of the sleeve 23 into the member 9 is such that it effects the correct engagement of gear 27 or gear 28 with gear 22.

In the second place, the axially directed face 37 of the notch 36 or 36′ forms a stop for lever 34 and thus limits the rotary movement of the sleeve when changing speed.

In the third place, the face 38 of notch 36 or 36′ is in the form of a ramp and acts on the lever 34 to raise or axially displace the sleeve 23 during turning or rotary movement, thereby causing the separation of the gear 27 or 28 from the gear 22 and thus ensuring the disengagement of the teeth. Such disengagement of the teeth is maintained during turning of sleeve 23 through half a complete revolution, whereupon the lever 34 riding on the edge 35 of the member 9 drops into the opposite notch 36 or 36′. The turning movement of sleeve 23 is completed under the action of the force exerted by the detent ball 31 in the conical recess 29. This ensures the easy shifting of the gear transmission.

FIGURES 5 and 6 show the positions of gears 27 and 28 and of the arm 34 for each of the two possible speeds. FIGURE 6 corresponds to the high speed position shown in FIGURE 2 and; FIGURE 5 corresponds to the normal speed position shown in FIGURE 4.

It is clear that the sizes of the driving gears and consequently the numbers of their teeth may be varied so as to obtain greater or lesser speeds in relation to the normal speed without thereby departing from the characteristics of the invention.

It will be seen that an articulated coupling joint having a gear transmission according to the invention, has the following advantages over known devices:

A more compact assembly;
Elimination of the set of intermediate pulleys, hence reducing the drive belt friction to a minimum;
Good mechanical output of the transmission gears;
Easy and smooth speed change by simple manipulation of the arm 34;
Simple removal of the sleeve 23 carrying the driving gears which are held in body 9 only by the detent ball 31, thereby facilitating cleaning, greasing and checking of the condition of the gears without requiring tools.

I claim:

1. A gear transmission comprising a body, a sleeve turnable in said body, a drive shaft rotatably mounted in said sleeve with the axis of rotation of said shaft being eccentric relative to the axis of turning of said sleeve in said body, one end of said drive shaft projecting from said body and being adapted for rotation by input means, two concentric gears of different diameters secured to the other end of said drive shaft within said body, a driven shaft rotatably mounted in said body and having a gear at one end thereof selectively engageable with said concentric gears secured to the drive shaft, said driven shaft having means at its other end adapted to couple said driven shaft to output means, and means for turning said sleeve relative to said body between first and second positions where one of said concentric gears and the other of said concentric gears, respectively, are engaged with said gear on the driven shaft.

2. A gear transmission as in claim 1; wherein said sleeve has a pair of diametrically opposed, conical recesses in the outer surface thereof, and said body has a bore opening at said outer surface of said sleeve and located to register with said recesses in said first and second positions, respectively, of said sleeve; and further comprising a detent member movable in said bore to selectively engage in said recesses and thereby releasably retain said sleeve in each of said positions thereof.

3. A gear transmission as in claim 2; wherein said detent member is in the form of a ball spring-urged in said bore in the direction toward said outer surface of the sleeve.

4. A gear transmission as in claim 1; wherein the axis of said drive shaft is inclined with respect to the axis of said driven shaft.

5. A gear transmission as in claim 1; wherein said sleeve is also axially movable in said body, said means for turning the sleeve includes a handle extending radially from said sleeve, an dsaid body has means defining a cam surface thereon engageable by said handle to axially displace said sleeve and drive shaft in the direction for separating said gears on the drive shaft from said gear on the driven shaft during turning of said sleeve between said positions.

6. A gear transmission as in claim 5; wherein said sleeve has diametrically opposed conical recesses in the outer surface thereof; and further comprising a ball member movably mounted in said body and spring urged against said outer surface of the sleeve to engage selectively in one of said recesses when said sleeve is at each of said positions, thereby to releasably retain said sleeve at each of said positions and to hold said sleeve against axial displacement when at each of said positions.

References Cited by the Examiner
UNITED STATES PATENTS

| 1,793,120 | 2/31 | Morell | 74—353 |
| 1,981,428 | 11/34 | Schneider | 74—353 |
| 3,050,856 | 8/62 | Staunt | 32—26 |

FOREIGN PATENTS

| 1,078,280 | 3/60 | Germany. |
| 276,939 | 8/27 | Great Britain. |

DON A. WAITE, *Primary Examiner.*